(12) United States Patent
Beason et al.

(10) Patent No.: US 9,829,402 B2
(45) Date of Patent: Nov. 28, 2017

(54) ACTUATOR SYSTEM WITH SMART LOAD CELL

(71) Applicant: GOODRICH CORPORATION, Charlotte, NC (US)

(72) Inventors: Joseph E. Beason, Kettering, OH (US); Kevin Rehfus, Troy, OH (US); Albert Keith Pant, Carlisle, OH (US); Thomas Freshour, Troy, OH (US); Scott Streng, Troy, OH (US); David Drennen, Bellbrook, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 185 days.

(21) Appl. No.: 14/612,763

(22) Filed: Feb. 3, 2015

(65) Prior Publication Data
US 2016/0223415 A1    Aug. 4, 2016

(51) Int. Cl.
| | |
|---|---|
| *G01L 5/22* | (2006.01) |
| *B64C 25/44* | (2006.01) |
| *G01L 25/00* | (2006.01) |
| *G01K 13/00* | (2006.01) |
| *B60T 17/22* | (2006.01) |
| *F16D 66/00* | (2006.01) |

(52) U.S. Cl.
CPC ............ *G01L 5/225* (2013.01); *B60T 17/221* (2013.01); *B64C 25/44* (2013.01); *F16D 66/00* (2013.01); *G01K 13/00* (2013.01); *G01L 25/00* (2013.01); *B60T 2250/06* (2013.01); *F16D 2066/005* (2013.01)

(58) Field of Classification Search
CPC . G01L 5/225; G01L 5/28; G01L 25/00; B60T 17/221; B60T 2250/06; B64C 25/44; F16D 66/00; F16D 2066/001; F16D 2066/005
See application file for complete search history.

(56) References Cited

U.S. PATENT DOCUMENTS

| | | | | |
|---|---|---|---|---|
| 6,810,316 B2 * | 10/2004 | Yokoyama | ............ | B60T 13/741 188/156 |
| 7,364,020 B2 * | 4/2008 | Ante | ..................... | B60T 17/221 188/1.11 E |

(Continued)

FOREIGN PATENT DOCUMENTS

| | | |
|---|---|---|
| EP | 2743531 | 6/2014 |
| EP | 2743665 | 6/2014 |

(Continued)

OTHER PUBLICATIONS

Extended European Search Report dated Jul. 27, 2016 in European Application No. 16154041.4.

*Primary Examiner* — Natalie Huls
(74) *Attorney, Agent, or Firm* — Snell & Wilmer, L.L.P.

(57) ABSTRACT

The present disclosure includes the use of a smart load cell in a system for controlling an electromechanical actuator. A load cell may be positioned along the outer surface of the electromechanical actuator. Further, the load cell may utilize strain gages and a microcontroller. The load cell may be configured to transmit data to an electric brake actuator controller which includes calibration for operating temperature of the electromechanical actuator.

11 Claims, 4 Drawing Sheets

(56) References Cited

U.S. PATENT DOCUMENTS

| | | | |
|---|---|---|---|
| 8,430,213 B2* | 4/2013 | Yokoyama | B60T 13/741 188/1.11 E |
| 2003/0125863 A1* | 7/2003 | Tamasho | B60T 13/741 701/70 |
| 2005/0140205 A1* | 6/2005 | Ante | B60T 17/221 303/20 |
| 2013/0048443 A1* | 2/2013 | Muramatsu | F16D 65/18 188/72.1 |
| 2014/0331756 A1 | 11/2014 | Shimoyama | |
| 2015/0021105 A1* | 1/2015 | Head | G01L 1/205 177/211 |
| 2017/0241848 A1* | 8/2017 | Rehfus | G01L 1/2206 |

FOREIGN PATENT DOCUMENTS

| | | |
|---|---|---|
| EP | 2869439 | 5/2015 |
| EP | 2873887 | 5/2015 |
| EP | 2965962 | 1/2016 |
| JP | H08327478 | 12/1996 |

\* cited by examiner

ACTUATOR SYSTEM WITH SMART LOAD CELL

FIELD

The present disclosure relates generally to aircraft wheel assemblies and, more specifically, to electromechanical actuator systems for aircraft wheel assemblies.

BACKGROUND

Conventional aircraft wheel assemblies comprise rotating and stationary stacks which stop the aircraft when compressed by electromechanical actuators. Typically, electromechanical actuators are controlled by an electric brake actuator controller. To properly account for variations in operating loads on the aircraft brake assemblies, electromechanical actuators frequently include load cells which provide feedback and are distinct from and independent of the actuator. These stand-alone load cells are calibrated manually, by adding individual resistors to the load cells. Such calibration requires significant time, labor, and can only be performed at actuator assembly time.

SUMMARY

An electromechanical actuator system in accordance with various embodiments may comprise an actuator and a load cell coupled to the actuator and comprising a circuit board, a strain gauge, a microcontroller, a bridge, and an output drive circuit in communication with the microcontroller. The load cell may comprise two strain gauges. The two strain gauges may be positioned apart from each other at approximately 180 degrees along a circumference of the outer surface of the housing. The load cell may further comprise an output drive circuit. The microcontroller may be positioned between the output drive circuit and a Wheatstone bridge. The output drive circuit may provide a signal to an electric brake actuator controller. The output drive circuit may comprise a serial interface. The load cell may further comprise a sense resistor in series with the Wheatstone bridge. The load cell may receive a voltage from the electric brake actuator controller.

A method for controlling an electromechanical brake actuator in accordance with various embodiments may comprise calibrating a load cell of an electromechanical actuator system, wherein the load cell comprises a flexible circuit board coupled to a housing and having at least one strain gauge, a microcontroller, a bridge, and an output drive circuit in communication with the microcontroller, and transmitting an output signal from the output drive circuit to an electric brake actuator controller. The method may further comprise transmitting a command signal from the electric brake actuator controller to an electromechanical brake actuator. The step of calibrating the load cell may comprise determining a minimum bridge value at a zero load and determining a maximum bridge value at a maximum load. The load cell may be configured to receive a voltage from the electric brake actuator controller. The output drive circuit may communicate with the electric brake actuator controller via a serial interface. The load cell may further comprise a sense resistor in series with the bridge.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
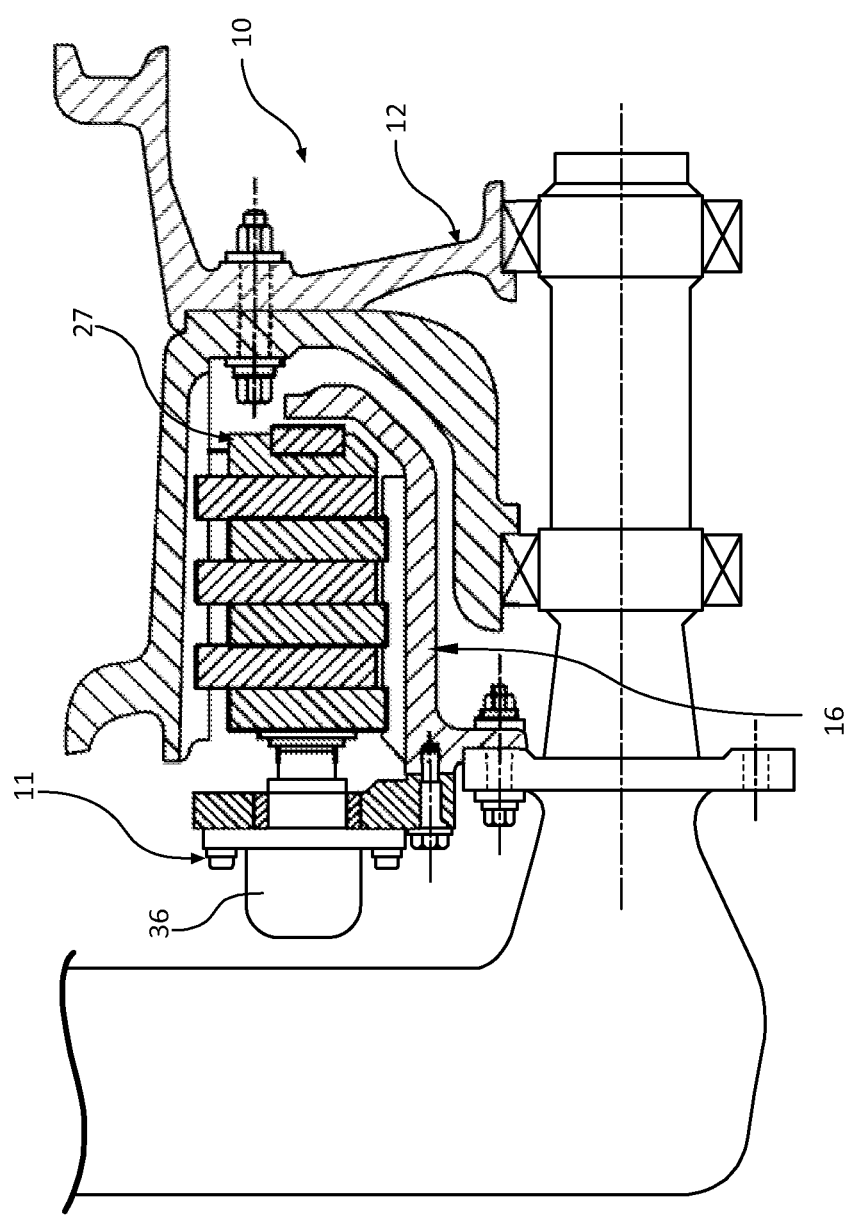
FIG. 1 illustrates a portion of an aircraft brake system in accordance with various embodiments.

With reference to FIG. 1, a portion of a wheel and brake system 10 is illustrated. Wheel and brake system 10 may comprise, for example, a brake assembly 11. In various embodiments, brake assembly 11 may be coupled to an axle of a wheel 12. For example, brake assembly 11 consists of rotors and stators that are compressed together by brake actuator 36 to reduce the speed of an aircraft.

In various embodiments, brake assembly 11 may comprise a brake stack 27 and a brake actuator 36. For example, brake stack 27 may comprise components that interface with both the rotating rotors and the wheel axle through torque tube 16.

Brake assembly 11 may further comprise, for example, one or more brake actuators 36. For example, brake actuators 36 may be configured such that in response to an operator activating a control (e.g., depressing a brake pedal), brake actuators 36 laterally compress brake stack 27 which, in turn, resist rotation of wheel 12 and thus reduces the speed of the aircraft.

Brake actuator 36 may comprise, for example, an electromechanical brake actuator. In various embodiments, a predetermined level of actuation force is applied to brake stack 27 by brake actuator 36. In various embodiments, brake actuator 36 may comprise a hydraulic actuator. In embodiments where brake actuator 36 is a hydraulic actuator, brake actuator 36 may be actuated by hydraulic pressure. In further embodiments, brake actuator 36 may comprise a hybrid electromechanical-hydraulic actuator. Any type of actuator is within the scope of the present disclosure.

Figure 2:
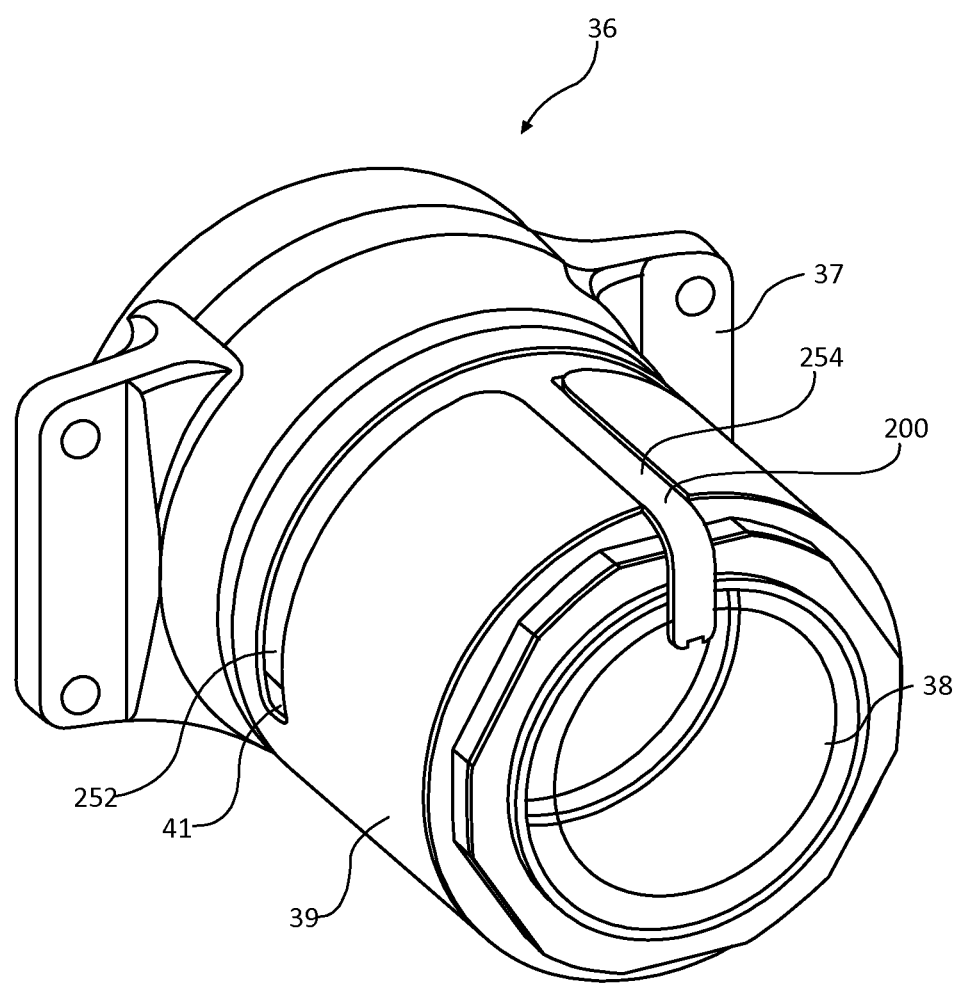
FIG. 2 illustrates a perspective view of an electromechanical brake actuator housing in accordance with various embodiments.

With reference to FIG. 2, in various embodiments, brake actuator 36 comprises a brake actuator housing 37. Brake actuator housing 37 may surround and house at least a portion of the components of brake actuator 36. Brake actuator housing 37 comprises an outer surface 39. In various embodiments, strain gauges that comprise a Wheatstone bridge 200 are affixed to outer surface 39 of brake actuator housing 37 to measure tension. For example, outer surface 39 may comprise a channel 41 into which Wheatstone bridge 200 may be positioned. Alternatively, Wheatstone bridge 200 may reside internal to brake actuator 36 and measure a compressive load. Any manner of affixing Wheatstone bridge 200 to any part of brake actuator 36 to measure tension or compressive forces is within the scope of the present disclosure.

Figure 3:
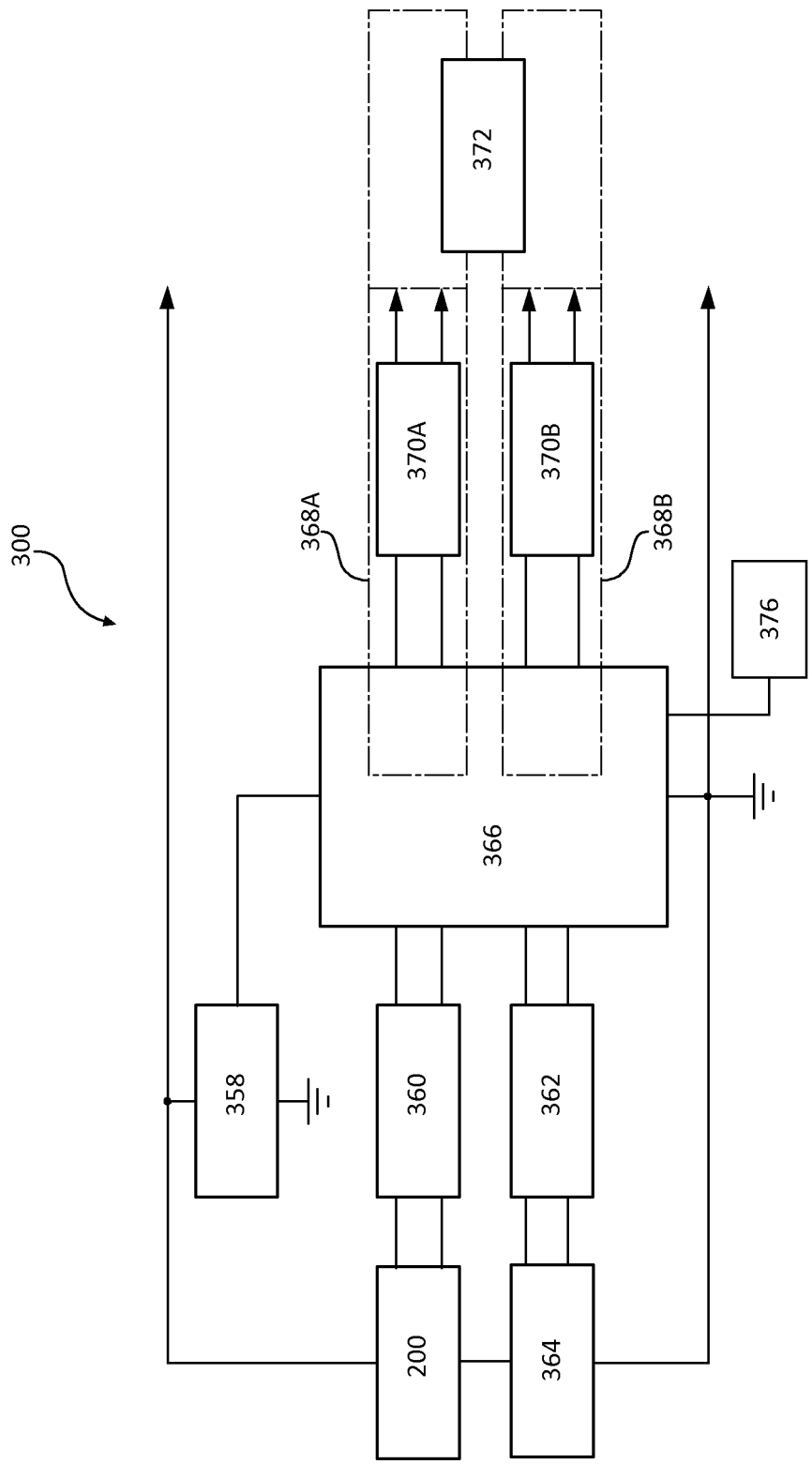
FIG. 3 illustrates a block diagram of a smart load cell system of an electromechanical brake actuator system in accordance with various embodiments.

In various embodiments, Wheatstone bridge 200 comprises a flexible printed circuit board 254. In various embodiments, Wheatstone bridge 200 comprises two strain gauges 252 positioned apart from one another. For example, two strain gauges 252 may be positioned approximately 180 degrees from each other along the circumference of outer surface 39 of brake actuator housing 37. Although described with reference to specific embodiments, any number and positioning of strain gauges 252 is with the scope of the present disclosure. With reference to FIGS. 2 and 3, a smart load cell 300 is formed by the combination of Wheatstone bridge 200, including one or more strain gauges 252, connected (e.g., by flexible printed circuit board 254) and a printed circuit board 38 comprising a microcontroller and an output drive circuit.

With reference to FIG. 3, an electrical block diagram of smart load cell 300 is illustrated. In various embodiments, data obtained from strain gauges 252 may be transmitted from bridge 200 to a signal conditioning component 360. For example, signal conditioning component 360 may comprise a component configured to make the output of bridge 200 suitable for processing by another component of smart load cell 300. For example, signal conditioning component 360 may comprise a filter, an amplifier, or any other component capable of conditioning the output of bridge 200 in a desired manner.

Smart load cell 300 may further comprise, for example, a microcontroller 366. Microcontroller 366 may be configured to operate as a data acquisition and digital signal processing system. For example, microcontroller 366 may receive data from bridge 200 via signal conditioning unit 360. Such data may be processed, stored, and analyzed by microcontroller 366. In various embodiments, microcontroller 366 comprises an analog to digital converter 374A, which may be configured to receive analog data from bridge 200 and convert it to digital data for processing by microcontroller 366.

After digital signal processing, data may be transmitted from microcontroller 366 to an electric brake actuator controller (EBAC) 372. In various embodiments, microcontroller 366 comprises an output drive circuit. For example, microcontroller 366 may comprise an output drive circuit 368A which comprises an analog drive circuit 370A. In such embodiments, microcontroller 366 provides data from a digital analog converter (within microcontroller 366) to analog drive circuit 370A, which may transmit the analog data to EBAC 372. Analog drive circuit 370A may comprise, for example, a 4 milliamp to 20 milliamp drive circuit.

In various embodiments, microcontroller 366 comprises an output drive circuit 368B which comprises a digital drive circuit 370B. In such embodiments, microcontroller 366 provides digital data to EBAC 372. For example, digital drive circuit 370B may such utilize a serial communication protocol, such as, for example, an RS232 or RS485 protocol. Although described with reference to specific embodiments, any manner of transmitting data from microcontroller 366 to EBAC 372 is within the scope of the present disclosure.

Microcontroller 366 may, for example, provide a cleaner and/or more accurate output signal to EBAC 372 than an unconditioned analog bridge 200 signal. Further, microcontroller 366 may be capable of bidirectional communication with EBAC 372. Bidirectional communication between microcontroller 366 and EBAC 372 may, for example, allow for built in testing to evaluate the health of EBAC 372 and various sensors, detection and correction of error conditions, among others. Optionally, additional components and/or sensor, such as, for example, an accelerometer 376, may be added to smart load cell 300 in communication with microcontroller 366. For example, accelerometer 376 may allow microcontroller 366 to monitor the health and performance of smart load cell 300, including through the use of built in testing processes. Although described with reference to specific features and components, the use of any component or sensor with smart load cell 300 and microcontroller 366 is within the scope of the present disclosure.

Smart load cell 300 may further comprise, for example, a temperature sensing element 364. In such embodiments, data may be transmitted from bridge 200 to temperature sensing element 364. Temperature sensing element 364 may transmit data to microcontroller 366. In various embodiments, data from temperature sensing element 364 may be sent to a signal conditioning component 362 (similar to signal conditioning component 360) prior to microcontroller 366. In various embodiments, microcontroller 366 comprises an analog to digital converter 374B, which may be configured to receive analog data from temperature sensing element 364 and convert it to digital data for processing by microcontroller 366.

Further, temperature sensing element 364 may allow microcontroller 366 to determine the operating temperature of brake actuator 36 by comparing data received from bridge 200 to data received from temperature sensing element 364. In such embodiments, microcontroller 366 may employ a temperature compensation formula to adjust or calibrate data received from bridge 200 prior to transmitting the data to EBAC 372. During use, the temperature of brake actuator 36 may increase, which can change the characteristics of strain gauges 252, which in turn may affect the accuracy of data provided by strain gauges 252. For example, as temperature increases, strain gauges 252 may expand axially and/or radially, thereby registering a positive strain on brake actuator housing 37. Likewise, as temperature decreases, strain gauges 252 may contract axially and/or radially, thereby registering a negative strain on brake actuator housing 37. Further, resistors and/or other components of bridge 200 may fluctuate as temperature increases or decreases. Therefore, determining the temperature of brake actuator 36 and/or brake actuator housing 37 may be beneficial in correcting and/or calibrating data received from bridge 200 by microcontroller 366.

In various embodiments, smart load cell 300 may further comprise a voltage reference 358. For example, voltage reference 358 may receive voltage from EBAC 372. Further, voltage reference 358 may provide a fixed voltage to bridge 200 and/or microcontroller 366.

Figure 4:
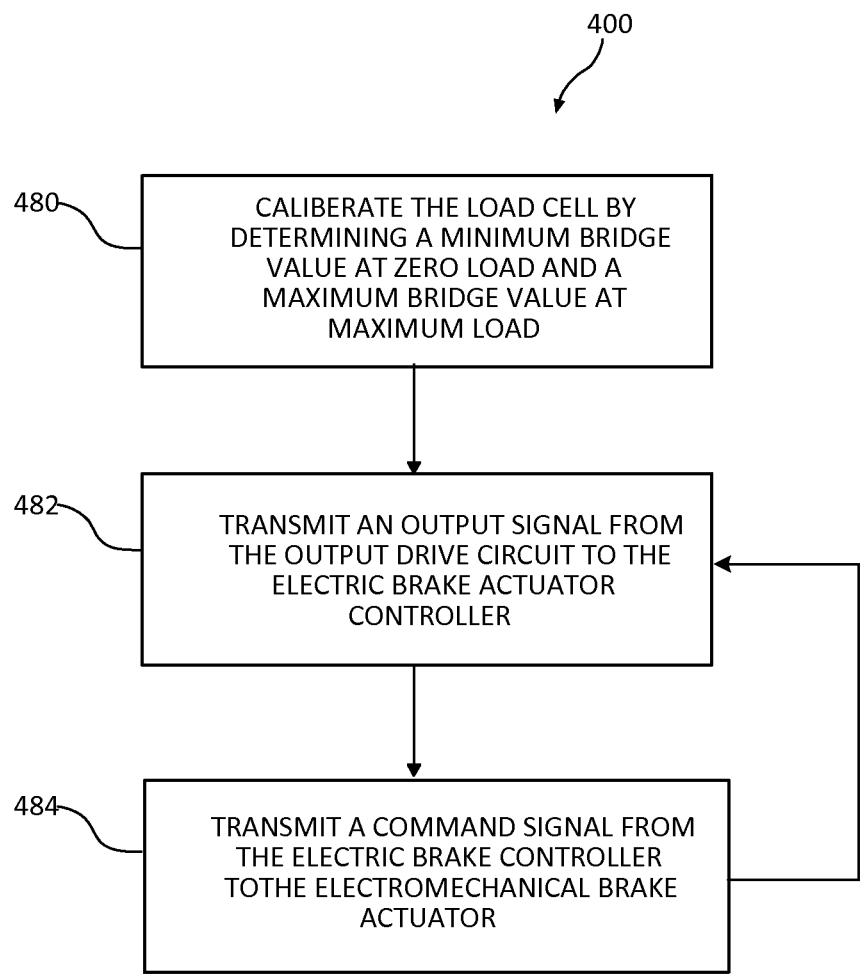
FIG. 4 illustrates a flow chart depicting a method of controlling an electromechanical actuator in accordance with various embodiments.

With reference to FIG. 4, a method 400 for controlling an electromechanical actuator in accordance with various embodiments is illustrated. For example, method 400 may comprise a step 480 of calibrating the load cell. For example, step 480 may comprise calibrating the load cell by determining a minimum bridge value at zero load and a maximum bridge value at maximum load. In various embodiments, the zero load value may be determined by bridge 200 when brake actuator 36 is under no external load (i.e., at rest and at zero extension). Further, the maximum bridge value may be determined by bridge 200 when brake actuator 36 is fully extended. The zero load value and the maximum load value may, for example, be transmitted from bridge 200 to microcontroller 366.

In various embodiments, the zero load trim value and maximum load trim value may be determined at any temperature. For example, the zero load value and maximum load value may be determined at "room" temperature. Room temperature can be defined as the temperature of the surroundings of the aircraft when the aircraft is not in flight. Variations in the load based on temperature changes are compensated for with temperature sensing element 364.

Method 400 may further comprise a step 482 of transmitting an output signal to an EBAC. For example, microcontroller 366 may transmit a signal through an output drive circuit (such as output drive circuit 368A and/or 368B) to EBAC 372. In various embodiments, microcontroller 366 may receive data from bridge 200 and adjust or calibrate the data using a temperature compensation formula. Such data may then be transmitted through the output drive circuit (such as output drive circuit 368A and/or 368B) to EBAC 372.

In various embodiments, method 400 further comprises a step 484 of transmitting a command signal from an EBAC. For example, step 484 may comprise EBAC 372 transmitting a command signal to brake actuator 36. In various embodiments, the command signal is calculating using data provided to EBAC 372 from smart load cell 300. Specifically, data transmitted from microcontroller 366 through an output drive circuit (such as output drive circuit 368A and/or 368B) may be used to calculate a command signal, which in turn is transmitted to brake actuator 36. In various embodiments, the command signal activates and causes a desired displacement of brake actuator 36.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator system, comprising:
    an actuator having a housing with an outer surface comprising a channel; and
    a load cell coupled to the actuator, the load cell comprising:
        a circuit board,
        a bridge including a strain gauge disposed within the channel and coupled to the housing of the actuator, the strain gauge configured to measure a strain on the housing of the actuator,
        a microcontroller configured to receive data from the bridge,
        and an output drive circuit in communication with the microcontroller.

2. The electromechanical actuator system of claim 1, wherein the load cell further comprises a temperature sensing element and the microcontroller is configured to determine an operating temperature of the electromechanical actuator system.

3. The electromechanical actuator system of claim 1, wherein the load cell comprises two strain gauges.

4. The electromechanical actuator system of claim 3, wherein the two strain gauges are positioned apart from each other at 180 degrees along a circumference of the outer surface of the housing.

5. The electromechanical actuator system of claim 1, wherein the load cell further comprises a temperature sensing element.

6. The electromechanical actuator system of claim 1, wherein the output drive circuit provides a signal to an electric brake actuator controller.

7. The electromechanical actuator system of claim 1, wherein the actuator comprises one of an electromechanical actuator, a hydraulic brake actuator, and a hybrid brake actuator.

8. The electromechanical actuator system of claim 1, wherein the load cell further comprises an accelerometer in communication with the microcontroller.

9. The electromechanical actuator system of claim 1, wherein the microcontroller and an electromechanical brake controller are in bidirectional communication with each other.

10. The electromechanical actuator system of claim 1, wherein the output drive circuit includes an analog drive circuit and a digital drive circuit.

11. The electromechanical actuator system of claim 10, wherein the analog drive circuit provides a digital signal to an electric brake actuator controller, and wherein the digital drive circuit provides an analog signal to the electric brake actuator controller.

\* \* \* \* \*